(12) United States Patent
Quaderer et al.

(10) Patent No.: US 11,608,132 B2
(45) Date of Patent: Mar. 21, 2023

(54) REINFORCING, BAFFLING, OR SEALING DEVICE FOR A VEHICLE STRUCTURE

(71) Applicant: Zephyros, Inc., Romeo, MI (US)

(72) Inventors: Dean Quaderer, Livonia, MI (US); Erin White, Wales Township, MI (US); Gary Vanlerberghe, Melvin, MI (US)

(73) Assignee: ZEPHYROS, INC., Romeo, MI (US)

( * ) Notice: Subject to any disclaimer, the term of this patent is extended or adjusted under 35 U.S.C. 154(b) by 0 days.

(21) Appl. No.: 17/494,925

(22) Filed: Oct. 6, 2021

(65) Prior Publication Data

US 2022/0024532 A1 Jan. 27, 2022

Related U.S. Application Data

(63) Continuation of application No. 14/870,958, filed on Sep. 30, 2015, now Pat. No. 11,173,973, which is a (Continued)

(51) Int. Cl.
*B62D 65/02* (2006.01)
*B62D 29/00* (2006.01)
*B21D 53/88* (2006.01)

(52) U.S. Cl.
CPC ............ *B62D 65/02* (2013.01); *B21D 53/88* (2013.01); *B62D 29/002* (2013.01); *Y10T 29/18* (2015.01); *Y10T 29/185* (2015.01); *Y10T 29/496* (2015.01); *Y10T 29/49616* (2015.01); *Y10T 29/49622* (2015.01); *Y10T 29/53* (2015.01); *Y10T 156/1003* (2015.01); *Y10T 156/1028* (2015.01)

(58) Field of Classification Search
CPC ...... B62D 65/02; B62D 29/002; B21D 53/88; Y10T 29/18; Y10T 29/185; Y10T 29/496; Y10T 29/49616; Y10T 29/49622; Y10T 29/53; Y10T 156/1003; Y10T 156/1028
See application file for complete search history.

(56) References Cited

U.S. PATENT DOCUMENTS 4,297,154 A 10/1981 Keller
4,712,868 A 12/1987 Tung et al.
(Continued)

FOREIGN PATENT DOCUMENTS

CN 87104555 A 3/1988
CN 201068271 Y 6/2008
(Continued)

OTHER PUBLICATIONS

Translation of International Search Report for corresponding PCT Application No. US/2010/029752 filed Apr. 2, 2010; Published as WO 2010/117897.

(Continued)

*Primary Examiner* — Rick K Chang
(74) *Attorney, Agent, or Firm* — The Dobrusin Law Firm, P.C.

(57) ABSTRACT

A reinforcing, baffling, or sealing device for a vehicle structure, the device comprising a carrier, an expandable material applied to the carrier, and openings formed in the carrier. The expandable material is formed of a heat activated material having foamable characteristics. The openings are formed in a repetitive pattern and perpendicular to a horizontal axis of the device. The device is stretched along the horizontal axis.

17 Claims, 5 Drawing Sheets

Related U.S. Application Data continuation of application No. 13/920,402, filed on Jun. 18, 2013, now Pat. No. 9,149,857, which is a continuation of application No. 12/420,406, filed on Apr. 8, 2009, now Pat. No. 8,479,395.

(56) References Cited

U.S. PATENT DOCUMENTS

| | | | |
|---|---|---|---|
| 4,918,542 | A | 4/1990 | Nagashima et al. |
| 4,969,970 | A | 11/1990 | Suzuki et al. |
| 5,575,526 | A | 11/1996 | Wycech |
| 5,755,486 | A | 5/1998 | Wycech |
| 5,766,719 | A | 6/1998 | Rimkus |
| 5,932,680 | A | 8/1999 | Heider |
| 6,131,897 | A | 10/2000 | Barz et al. |
| 6,892,507 | B1 | 5/2005 | Pease |
| 7,199,165 | B2 | 4/2007 | Kassa et al. |
| 7,406,849 | B2 | 8/2008 | Ueno et al. |
| 7,488,301 | B2 | 2/2009 | Beden et al. |
| 8,580,058 | B2 | 11/2013 | Czaplicki |
| 8,991,414 | B2 | 3/2015 | Gronau et al. |
| 9,149,857 | B2 * | 10/2015 | Quaderer ............ B62D 65/02 |
| 2004/0076831 | A1 | 4/2004 | Hable et al. |
| 2005/0241756 | A1 | 11/2005 | Harthcock et al. |
| 2005/0260399 | A1 | 11/2005 | Finerman |
| 2007/0117874 | A1 | 5/2007 | Kassa et al. |
| 2010/0274172 | A1 | 10/2010 | Guenther et al. |

FOREIGN PATENT DOCUMENTS

| | | |
|---|---|---|
| GB | 2 166 688 A | 5/1986 |
| JP | S6434954 U | 3/1989 |
| JP | H10644 A | 1/1998 |
| JP | 2003237624 A | 8/2003 |
| JP | 2006334998 A | 12/2006 |
| JP | 2007526160 A | 9/2007 |

OTHER PUBLICATIONS

China First Office Action dated Feb. 22, 2013, Application No. 2010800218603.
China Second Office Action dated Oct. 10, 2013, Application No. 2010800218603.
EP Office Action dated Nov. 24, 2011, Application No. 10714507.0-2425.
EP Office Action dated Oct. 31, 2012, Application No. 10714507.0-2425.
EP Office Action dated Sep. 16, 2013, Application No. 10714507.0-2425.
Indian Office Action for Application No. 7661/DELNP/2011 dated Oct. 11, 2017.
Japanese Search Report for Application No. 2012-504724 dated Jan. 9, 2014.
Chinese Search Report for Application No. 2010800218603 dated Feb. 6, 2013.

* cited by examiner

REINFORCING, BAFFLING, OR SEALING DEVICE FOR A VEHICLE STRUCTURE

CLAIM OF PRIORITY

This application claims the benefit of the filing date of U.S. application Ser. No. 12/420,406, filed on Apr. 8, 2009 the entirety of the contents of this application being hereby expressly incorporated by reference.

TECHNICAL FIELD

The present invention relates generally to a baffling, sealing or reinforcement member that includes one or more materials with formed openings along the one or more materials that allow the materials to stretch.

BACKGROUND

The transportation industry continues to require methods of baffling, sealing and reinforcement that provide improved functionality while simultaneously providing reduced weight and cost. Often, improved functionality is accompanied by an increase in weight and an increased cost. For example, improved strength in rigid materials often requires additional material which leads to an increase in both cost and weight. Alternatively, many lighter weight materials with improved strength often include an increase in cost as well. In an effort to reduce overall weight, expandable materials are often used for purposes of baffling, sealing, and reinforcement. Many expandable materials have a number of additional issues. Materials with improved expansion characteristics are often difficult to control and are usually paired with increased cost. Additionally, often as the strength of an expandable material increases so does the weight. Adhesive materials are also commonly used in for baffling, sealing and reinforcement applications and also show a tendency for increased cost associated with improved adhesion. The present invention addresses the need for materials that show improved ability for baffling, sealing and reinforcing while providing reduced weight and reduced cost.

SUMMARY OF THE INVENTION

In a first aspect, the present invention contemplates a method for reinforcing, baffling, or sealing a vehicle structure comprising providing one or more materials for reinforcing, baffling or sealing a vehicle structure wherein the one or more materials has a horizontal axis, at least one terminating edge, and an initial length. Openings may then be formed in the one or more materials in repetitive patterns along the one or more materials so that the forming of the openings removes no material. The material may then be stretched to a placement length that is at least 1.3 times the initial length, wherein the placement length corresponds to a length of a location requiring reinforcement, baffling, sealing or any combination thereof. The stretched material may then be applied to the location requiring reinforcement, baffling, sealing or any combination thereof so that the total amount of material applied is less than would be required if the material contained no openings. The openings may be formed perpendicular to the horizontal axis. The formed openings may alternate so that every other opening severs the one or more materials at the at least one terminating edge and the remaining adjacent openings sever the one or more materials along the horizontal axis.

The methods disclosed herein offer a number of benefits and advantages including but not limited to one or any combination of the following. The amount of material required to effectively seal or reinforce a vehicle structure may be reduced. In the case of expandable materials, the ability to control the direction and amount of expansion may be improved. The sealing, baffling or reinforcing may be customized as location and amount of material may be easily varied.

DETAILED DESCRIPTION

The present invention allows for the customization of one or more materials for baffling, sealing or reinforcement of a vehicle structure. The embodiments disclosed herein describe a method for forming openings in materials so that the materials can be adjusted to a desired length, shape, curvature or any combination thereof for more precise fit within a vehicle structure. The materials disclosed herein may be further customized for preferred expansion characteristics.

Figure 1A:
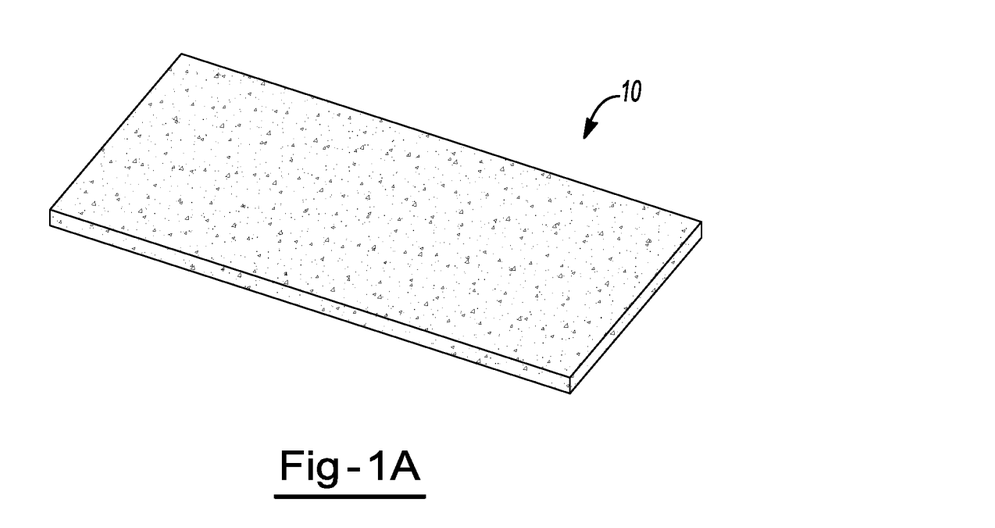
FIG. 1A shows an illustrative example of an expandable material with no formed openings.
Figure 1B:
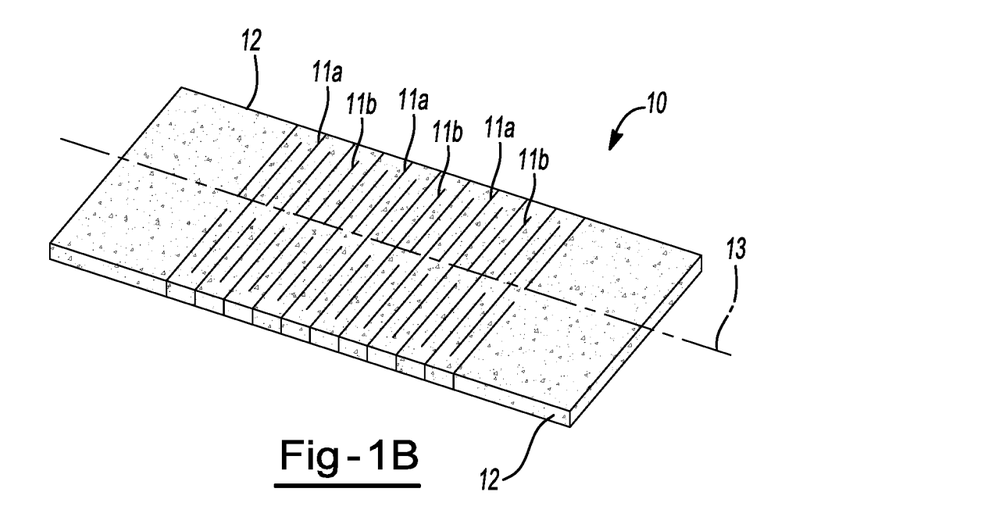
FIG. 1B illustrates the expandable material of FIG. 1A including formed openings.

FIGS. 1A and 1B show an expandable material 10 before (FIG. 1A) and after (FIG. 1B) forming of the openings 11. Openings 11a are shown as two slits severing the expandable material 10 from both terminating edges 12 while the expandable material remains connected at the horizontal axis 13 between the two slits. Openings 11b are shown as one slit severing the expandable material at the horizontal axis 13, while the expandable material remains connected at the terminating edges 12. Openings 11a and 11b are shown as alternating along the length of the expandable material. The openings 11a and 11b are shown as slits within the expandable material so that no material is removed during cutting and waste is thereby minimized. The openings can be formed in any pattern and in any location along a material for baffling, sealing or reinforcement, so long as the openings allow the material to be stretched to at least 1.2 times the original length of the material (e.g., the length of the material prior to the forming of any openings in the material). The slits may be cut small so that minimal stretching occurs, or the slits may be large, such that only a small amount of the material remains connected thereby allowing for maximum stretching. The slits may be formed to any size according to the amount of stretching required. The openings may be formed in close proximity to one another as shown in FIG. 1B. The openings may also be formed with a predetermined amount of space between each opening so that a certain amount of un-cut material remains between each opening. The openings may be formed in repetitive patterns or may be formed at random locations with no specific organization.

The size of the formed openings may generally depend on the size of the material being cut. In referring to the size of the openings, the openings may be formed as slits in the material so that no material is actually removed and the size of the openings may be the length of the slit formed in the material. The formed openings may generally be at least about 10 mm. The formed openings may be less than about 150 mm. The size of the formed openings may be at least about 15 mm. The size of the formed openings may be less than about 30 mm. However, if the material is particularly large (e.g., having a height (h) greater than about 200 mm) or particularly small (e.g., having a height (h) less than about 40 mm) the openings may be larger or smaller in accordance with the relative height of the starting material.

Figure 2A:
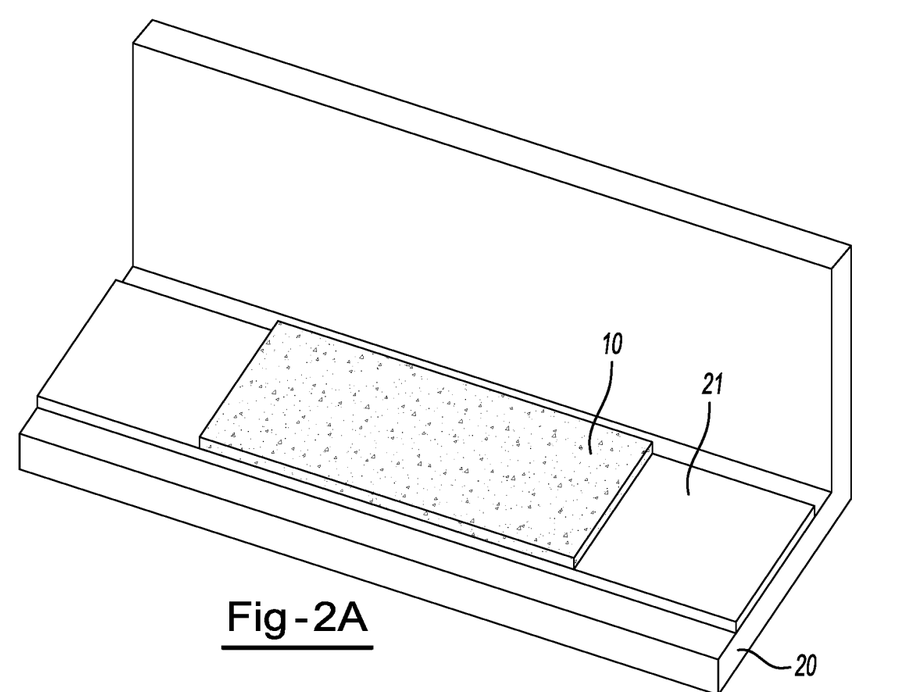
FIG. 2A illustrates the expandable material of FIG. 1A applied to a vehicle structure and including a carrier.
Figure 2B:
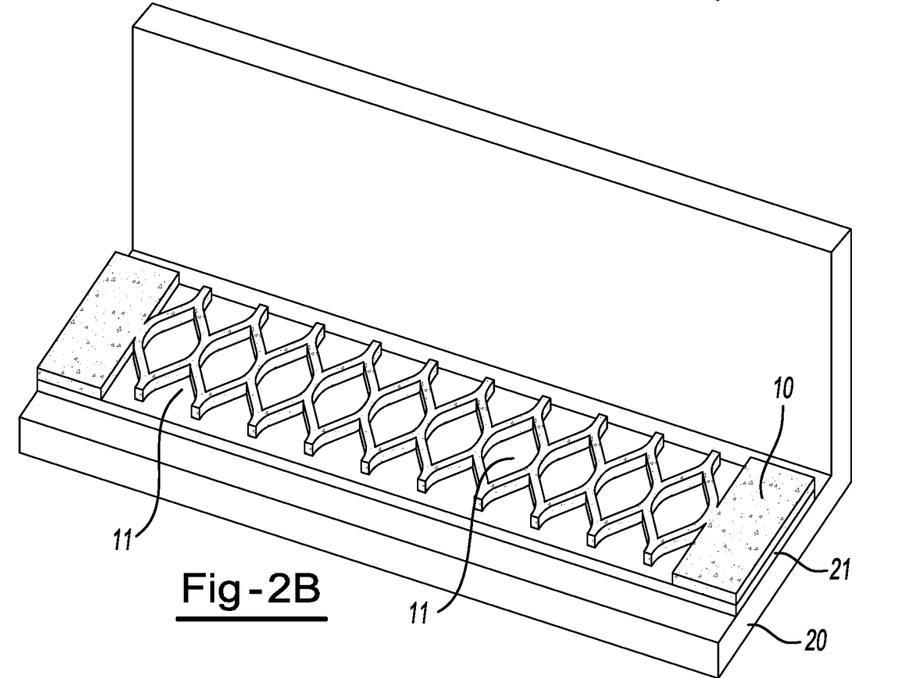
FIG. 2B illustrates the expandable material of FIG. 1B applied to a vehicle structure and including a carrier.

After the openings are formed, the material may be placed within and/or in contact with any vehicle structure at any location requiring baffling, sealing or reinforcement. FIG. 2A shows the expandable material 10 shown at FIG. 1A applied to a vehicle structure 20 including a carrier 21. The expandable material shown covers only a small portion of the carrier. However, as illustrated in FIG. 2B, the expandable material shown in FIG. 1B can be stretched and applied to the vehicle structure 20 and carrier 21. The expandable material with the openings 11 is able to stretch the entire length of the carrier 21. The amount of starting expandable material 10 shown in FIGS. 1A and 1B is the same, but the formed openings 11 allow for extended coverage of the carrier 21.

Figure 3A:
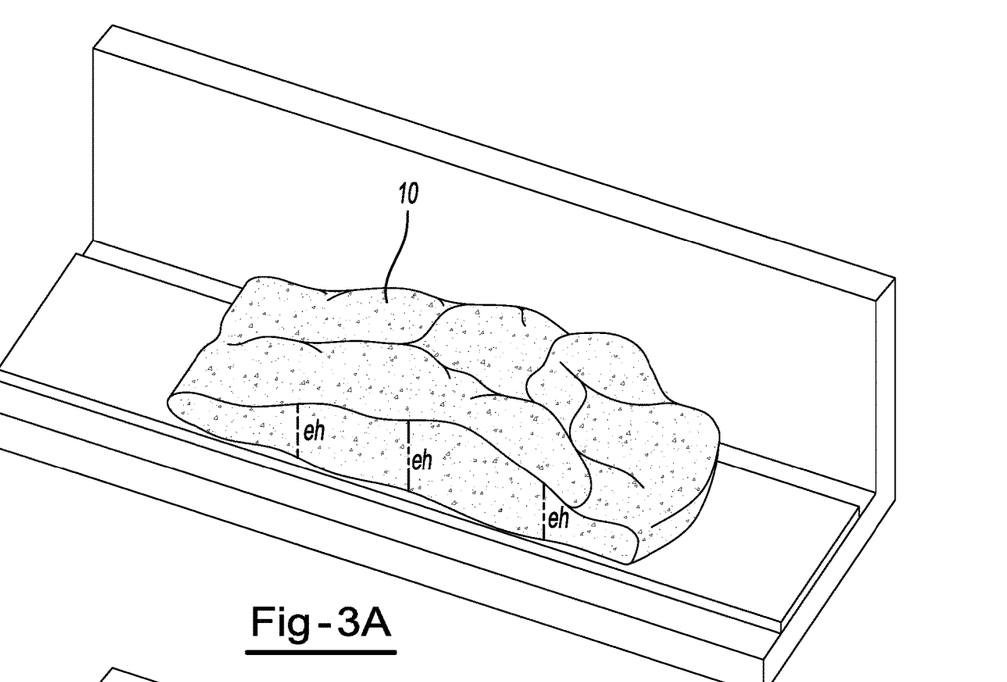
FIG. 3A illustrates the vehicle structure of FIG. 2A after activation of the expandable material.
Figure 3B:
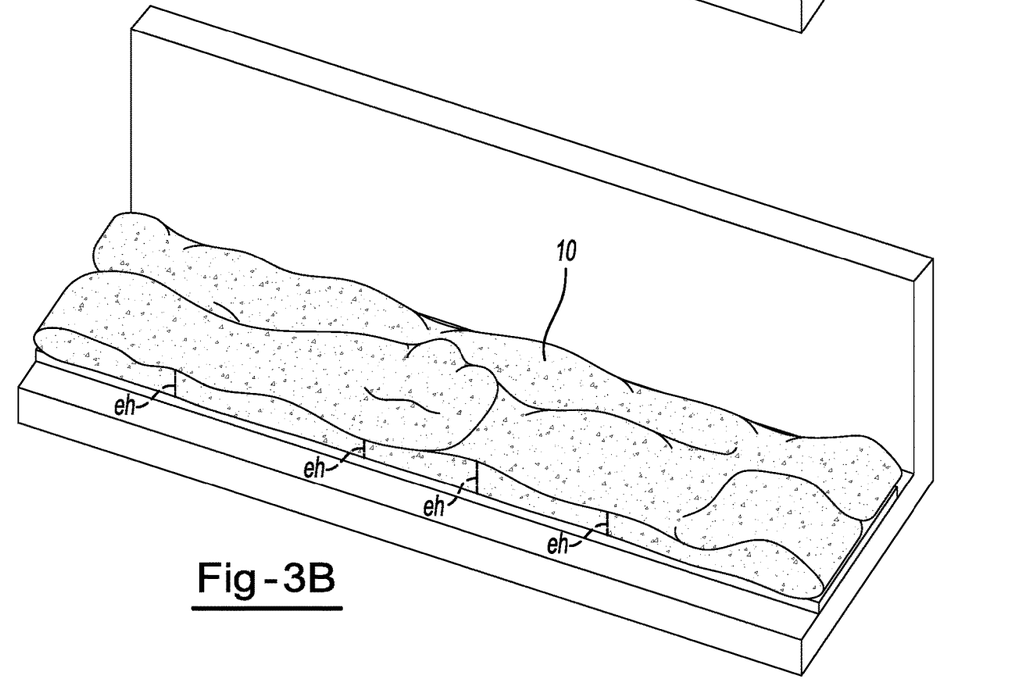
FIG. 3B illustrates the vehicle structure of FIG. 2B after activation of the expandable material.

After application of the expandable material 10 into and/or in contact with a vehicle structure, the expandable material may expand via a predetermined set of conditions. For example, exposure to certain levels of heat may cause the expandable material to expand. FIG. 3A illustrates the expansion characteristics of the expandable material 10 with no formed openings shown at FIGS. 1A and 2A. FIG. 3B illustrates the expansion characteristics of the expandable material 10 with formed openings 11 shown at FIGS. 1B and 2B. The expansion height (eh) of the expandable material 10 shown in FIG. 3A is inconsistent along the length of the expandable material 10. The expansion height (eh) of the expandable material 10 shown in FIG. 3B is relatively consistent along the length of the expandable material 10. A more consistent expansion height allows for improved reinforcement, baffling, and sealing, whereas an inconsistent expansion height results in possible weak spots and/or discontinuous sealing.

Figure 4:
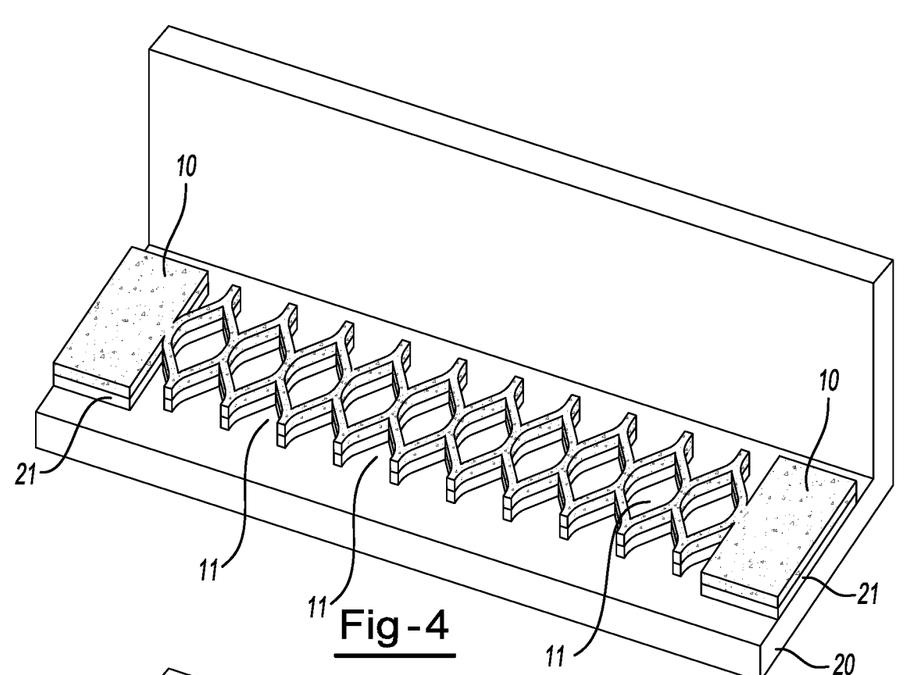
FIG. 4 shows an illustrative example in accordance with the present invention wherein both the carrier and expandable material include complementary formed openings.
Figure 5:
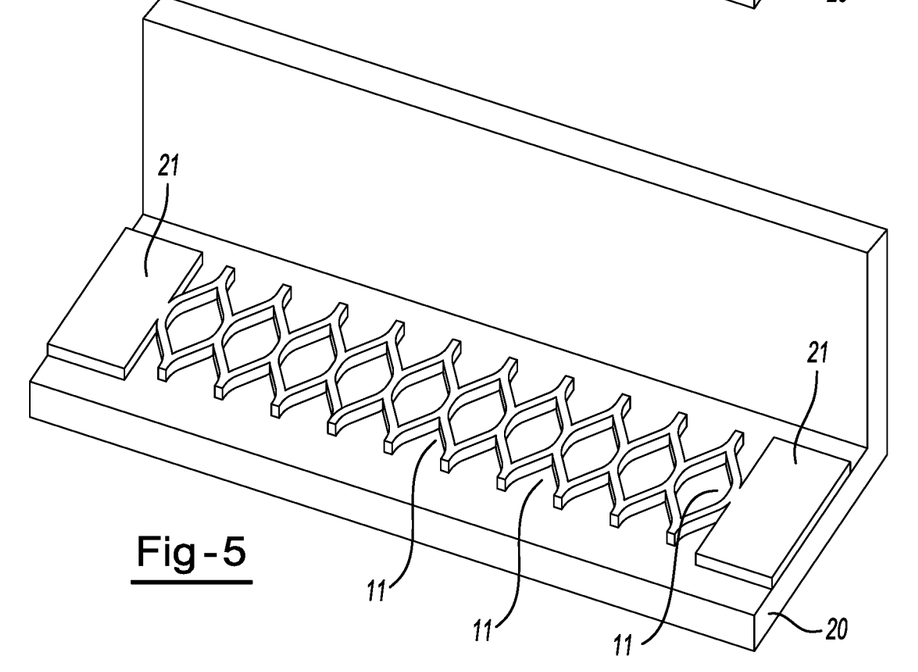
FIG. 5 shows an illustrative example in accordance with the present invention wherein only a carrier material includes formed openings.

The carrier 21 may also include formed openings, as shown for example in FIG. 4. The formed openings 11 in the carrier material may be similar to the pattern shown in the expandable material 10, as illustrated in FIG. 4. Alternatively, any formed openings in the carrier material may be cut in a pattern that differs from that formed in the expandable material 10. In another embodiment, formed openings 11 may be formed in the carrier material 21 and the carrier material may be used to provide reinforcement without the use of any expandable material, as shown for example in FIG. 5.

Figure 6:
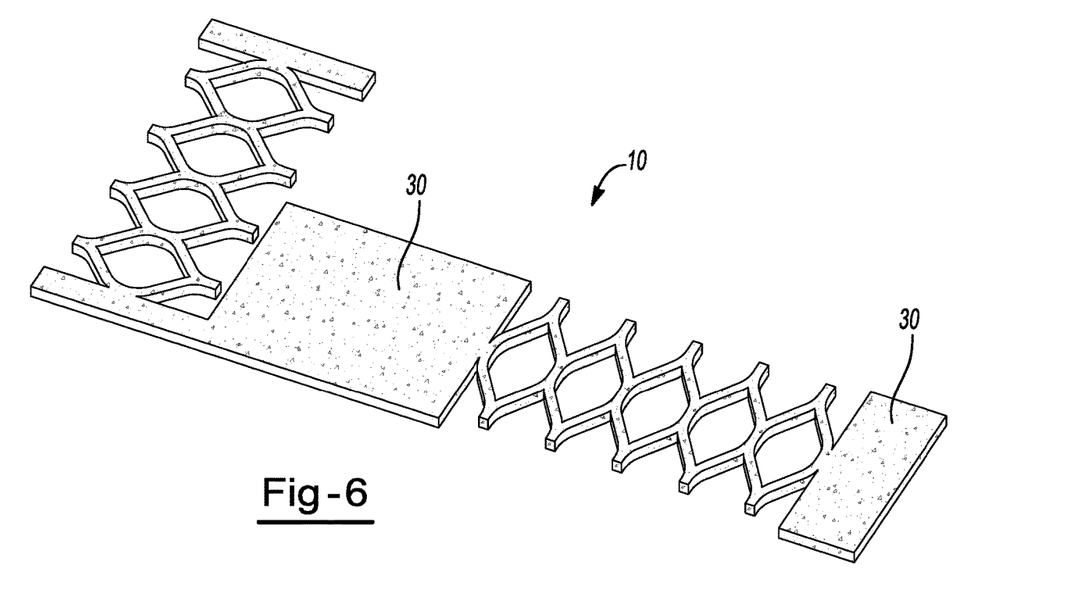
FIG. 6 shows an illustrative example in accordance with the present invention where an expandable material including formed openings that are cut to fit a specific cavity shape.

The material used for baffling, sealing and reinforcement may have openings that are formed in a specific pattern so that the material will fit the shape of a particular vehicle cavity. As illustrated for example in FIG. 6, an expandable material 10 may have openings formed so that the material may be stretched in two opposing directions according to the profile of a vehicle cavity. Further, the expandable material may include sections 30 with no openings to account for vehicle cavity areas that may require an increased expansion height of the expandable material.

Figure 7:
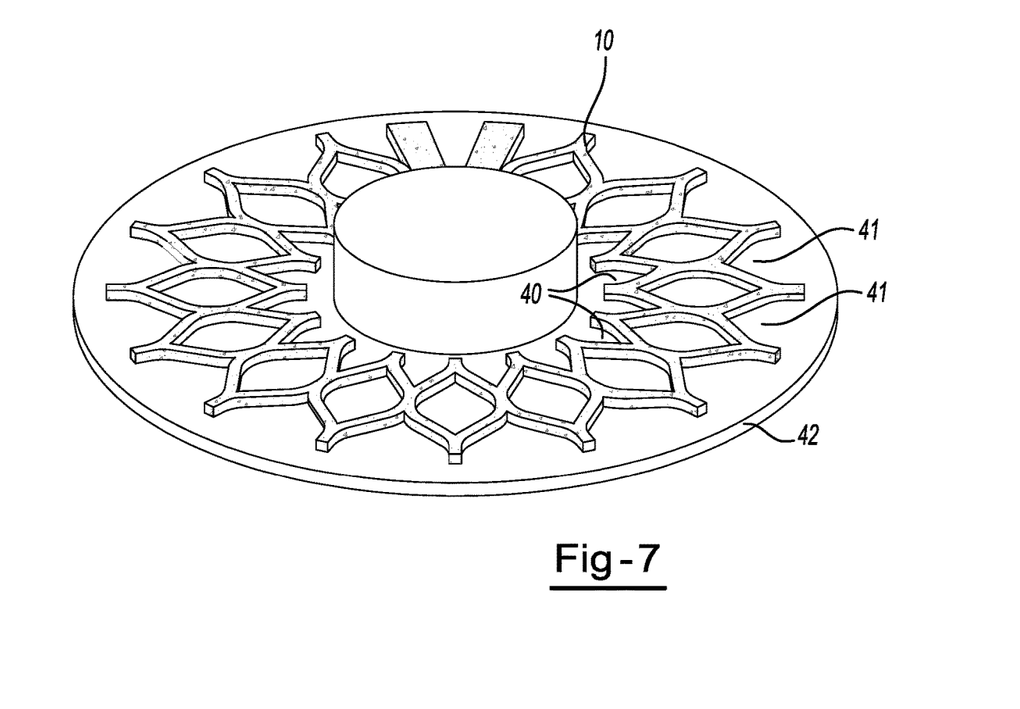
FIG. 7 illustrates a material of the present invention applied to a vehicle structure of circular shape.

The openings may also be formed so that the material can be stretched and curved to fit along a rounded surface. As illustrated for example in FIG. 7, expandable material 10 may be cut so that smaller slits are formed in the top portion 40 of the material and larger slits are formed in the bottom portion 41 of the material. This allows the expandable material 10 to be placed along a curved surface 42 within a vehicle structure, while allowing the material to lay flush against the surface thereby maintaining equal coverage around the surface.

The formed openings of the present invention also provide space for fasteners and/or weld spots. Preferably, the material can be applied to a vehicle structure and additional parts or materials can be attached with fasteners that are exposed via a formed opening. Further, the formed openings may allow for welding processes to be performed on areas of a vehicle structure that are exposed via a formed opening. With the use of existing materials for baffling, sealing and reinforcement, once the materials are applied to a vehicle structure, access to the underlying structure is no longer feasible due to the solid nature of the materials. The formed openings of the present invention may also allow access to an underlying vehicle structure after application of the material.

The openings may be formed in the materials of the present invention using a die-cutting process. The openings may also be rotary cut. The openings may be press cut or cut with a laser or water jet. Alternatively, the openings may be molded into the materials.

The material for baffling, sealing, or reinforcement may include a means for maintaining the material within and/or in contact with a vehicle structure. The means may include a fastener such as a tree-fastener or a threaded screw fastener. The fastener may also be provided in a variety of shapes and in a variety of configurations so long as it can secure the material for baffling, sealing or reinforcement to a structure. Preferably, the fastener is capable of securing multiple layers or types of materials to a structure. Examples of suitable fasteners include mechanical fasteners, clips, snap-fits, screws, hooks, combinations thereof or the like. For attachment to a vehicle structure, the formed openings may also be cut to fit around tabs located on the vehicle structure in order to hold the material in place. Furthermore, it is contemplated that the one or more fasteners may be formed integral of a singular material with the material for baffling, sealing or reinforcement or may be formed of a different material and may be removably attached to the carrier.

The fastener may be provided as a magnetic material or an adhesive material that can attach (e.g., adhere or magnetically secure) material for baffling, sealing, or reinforcement to a vehicle structure. The magnetic material or the adhesive material may be interspersed with a carrier material or an expandable material. Alternatively, the magnetic material or the adhesive material may be disposed upon the carrier material and/or the expandable material or may be otherwise connected to the carrier material and/or the expandable material.

The material for baffling, sealing, or reinforcement can be formed of a variety materials such as polymers, elastomers, fibrous materials (e.g., cloth or woven materials), thermoplastics, plastics, nylon, combinations thereof or the like. The material may also be an expandable material formed of a heat activated material having foamable characteristics. The material may be generally dry to the touch or tacky and may be shaped in any form of desired pattern, placement, or thickness, but is preferably of substantially uniform thickness. Though other heat-activated materials are possible for the expandable material, a preferred heat activated material is an expandable polymer or plastic, and preferably one that is foamable. A particularly preferred material is a relatively high expansion foam having a polymeric formulation that includes one or more of an acrylate, an acetate, an elastomer, a combination thereof or the like. For example, the foam may be an EVA/rubber based material, including an ethylene copolymer or terpolymer that may possess an alpha-olefin. As a copolymer or terpolymer, the polymer is composed of two or three different monomers, i.e., small molecules with high chemical reactivity that are capable of linking up with similar molecules. Preferred materials are disclosed in U.S. Pat. No. 7,199,165 and U.S. Patent Publication No. 2007/0117874.

A number of baffling or sealing foams are known in the art and may also be used to produce the foam. A typical foam includes a polymeric base material, such as one or more ethylene-based polymers which, when compounded with appropriate ingredients (typically a blowing and curing agent), expands and cures in a reliable and predictable manner upon the application of heat or the occurrence of a particular ambient condition. From a chemical standpoint for a thermally-activated material, the structural foam is usually initially processed as a flowable material before curing, and upon curing, the material will typically cross-link making the material incapable of further flow.

While the preferred materials for fabricating the expandable material have been disclosed, the expandable material can be formed of other materials provided that the material selected is heat-activated or otherwise activated by an ambient condition (e.g. moisture, pressure, time or the like) and cures under appropriate conditions for the selected application. One such material is the epoxy based resin disclosed in U.S. Pat. No. 6,131,897, the teachings of which are incorporated herein by reference. Some other possible materials include, but are not limited to, polyolefin materials, copolymers and terpolymers with at least one monomer type an alpha-olefin, phenol/formaldehyde materials, phenoxy materials, and polyurethane materials with high glass transition temperatures. Additional materials may also be used such as those disclosed in U.S. Pat. Nos. 5,766,719; 5,755,486; 5,575,526; and 5,932,680, incorporated by reference herein.

The materials for baffling, sealing and reinforcement may also include an adhesive. The adhesive material is typically an activatable material meaning that the adhesive material can be activated to melt, adhere, foam, expand, cure, thermoset or any combination thereof, although not necessarily required. Such activation is typically brought about by exposure of the adhesive material to a condition such as heat, radiation, moisture or the like. It is also contemplated that the adhesive material may be used alone or may be used in conjunction with a carrier material, an expandable material or additional expandable material or any combination thereof for forming a reinforcement, baffle or seal.

The adhesive material may have a polymeric formulation that includes or is based upon one or more of an epoxy, an acrylate, an acetate, an ethylene polymer (e.g., copolymer), an elastomer, a combination thereof or the like. The adhesive material may be particularly useful for applications including sealing and/or structural reinforcement and/or adhesion. For structural applications, expansion of the adhesive material is typically small if there is any expansion at all.

The adhesive material may be a pressure-sensitive material that is activatable upon application of predetermined pressure conditions. One particularly useful material is described in U.S. Patent Publication No. 2005/0241756.

In applications where the adhesive material or any other expandable material is a heat activated material, an important consideration involved with the selection and formulation of the material is the temperature at which a material cures and, if expandable, the temperature of expansion. Typically, the material becomes reactive (cures, expands or both) at higher processing temperatures, such as those encountered in an automobile assembly plant, when the material is processed along with the automobile structures at elevated temperatures or at higher applied energy levels, e.g., during coating (e.g., e-coat, paint or clearcoat) curing steps. While temperatures encountered in an automobile assembly operation may be in the range of about 148.89° C. to 204.44° C. (about 300° F. to 400° F.) for body shop applications (e.g., e-coat) and, for paint shop applications, are commonly about 93.33° C. (about 200° F.) or slightly higher (e.g., 120° C.-150° C.).

The materials may also include a film layer, such as that disclosed in U.S. Patent Publication Nos. 2004/0076831 and 2005/0260399. The film layer may be applied prior to forming openings within the material or may be applied after forming of the openings. The film layer may be used to cover a material that is tacky to the touch. The film layer may be removed from the material prior to application of the material to a vehicle structure, such that the film will reveal a tacky surface of the material that will adhere to the structure.

Formation of the materials of the present invention may include a variety of processing steps depending on the desired configuration of the materials. The preferred materials can be processed by injection molding, extrusion compression molding or with a mini-applicator. It is generally contemplated one or more layers of materials or one or more different types of materials, including any fasteners and adhesives may be manually attached to each other, automatically attached to each other or a combination thereof. Moreover, various processes such as molding (e.g., compression, injection or other molding), extrusion or the like may be used to form a carrier material and an expandable material individually and such processes may be employed to attach these materials together.

The thickness of the materials of the present invention for any of the embodiments herein may be from about 0.2 mm to about 10 mm, depending on the composition of material used. The thickness of the materials may be at least about 1 mm. The thickness of the materials may be less than about 5 mm. The thickness of the material may be at least about 1.5 mm. The thickness of the materials may be less than about 2.5 mm. The materials may be thick enough so that the risk of breakage after forming of the openings is reduced. Further, the materials may not be so thick so as to prevent forming of the openings via any cutting method disclosed herein.

Though not necessarily drawn to scale, geometries, relative proportions and dimensions shown in the drawings are also part of the teachings herein, even if not explicitly recited. However, unless otherwise stated, nothing shall limit the teachings herein to the geometries, relative proportions and dimensions shown in the drawing.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The invention claimed is:

1. A reinforcing, baffling, or sealing device for a vehicle structure, the device comprising:
    a carrier;
    an expandable material, applied to the carrier, and formed of a heat activated material having foamable characteristics;
    openings formed in the carrier and the expandable material in a repetitive pattern and perpendicular to a horizontal axis of the device; and
    an adhesive material;
    wherein the device is stretched along the horizontal axis; and
    wherein a film layer is located on the carrier on a first side of the carrier which opposes a second side of the carrier; and wherein the expandable material is secured to the second side of the carrier.

2. The device according to claim 1, wherein the openings are slits.

3. The device according to claim 2, wherein the slits are formed in a manner such that no material is removed.

4. The device according to claim 3, wherein the slits are formed with a die-cutting process.

5. The device according to claim 3, wherein the slits are formed with a rotary cutting process.

6. The device according to claim 3, wherein the slits range from about 10 mm to about 150 mm in their largest dimension.

7. The device according to claim 1, wherein the openings sever the device from opposing terminating edges while the device remains connected at the horizontal axis.

8. The device according to claim 7, wherein the openings formed in the expandable material and the openings formed in the carrier are similar.

9. The device according to claim 1, wherein the openings sever the device at the horizontal axis while the device remains connected at opposing terminating edges.

10. The device according to claim 9, wherein the openings formed in the expandable material and the openings formed in the carrier are similar.

11. The device according to claim 1, wherein the device includes a rigid polymeric material.

12. The device according to claim 1, wherein the film layer covers the adhesive material.

13. The device according to claim 1, wherein the expandable material can be adjusted to a desired length, shape, curvature, or any combination thereof.

14. The device according to claim 1, wherein the device is adapted to be located in a vehicle cavity.

15. The device according to claim 13, wherein the device is stretched to at least 1.3 times an initial length of the device.

16. The device according to claim 1, wherein the expandable material is extruded onto the carrier.

17. The device according to claim 1, wherein the expandable material expands to a height that is consistent along a length of the expanded material.

* * * * *